(No Model.) 2 Sheets—Sheet 2.
G. W. PRINGLE & W. BRODIE.
BORING MACHINE.
No. 526,198. Patented Sept. 18, 1894.
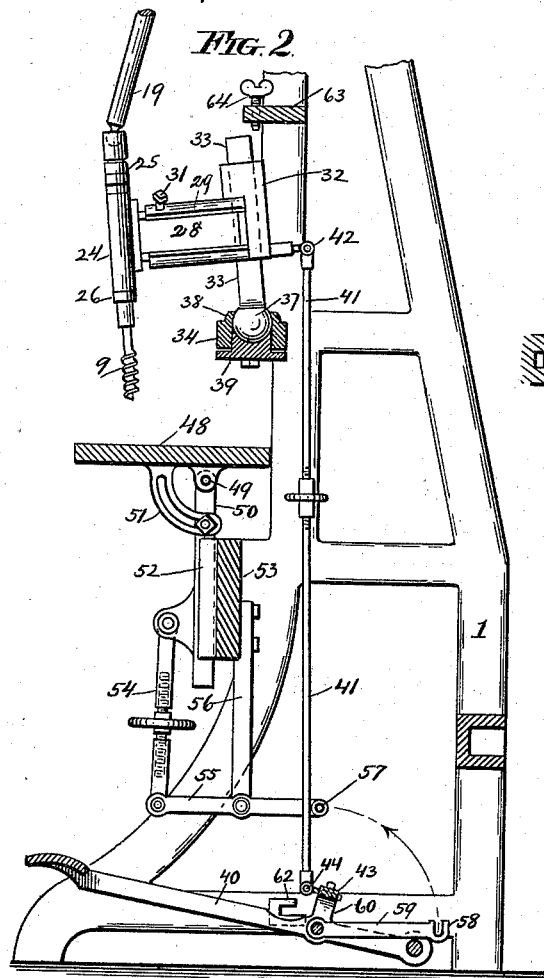
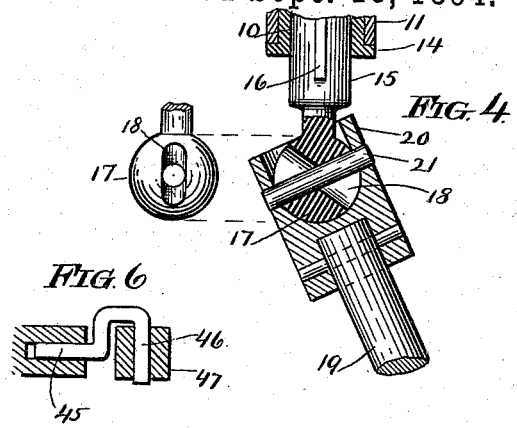
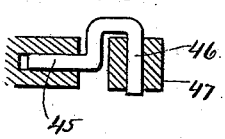
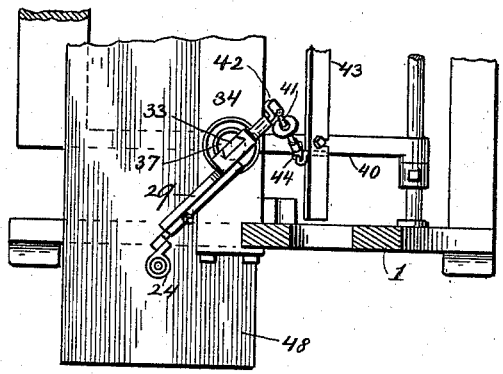
Witnesses:
J. Halpenny.
A. H. Cooper.
Inventors:
George W. Pringle and
William Brodie
By their attorneys
Gridley & Hopkins

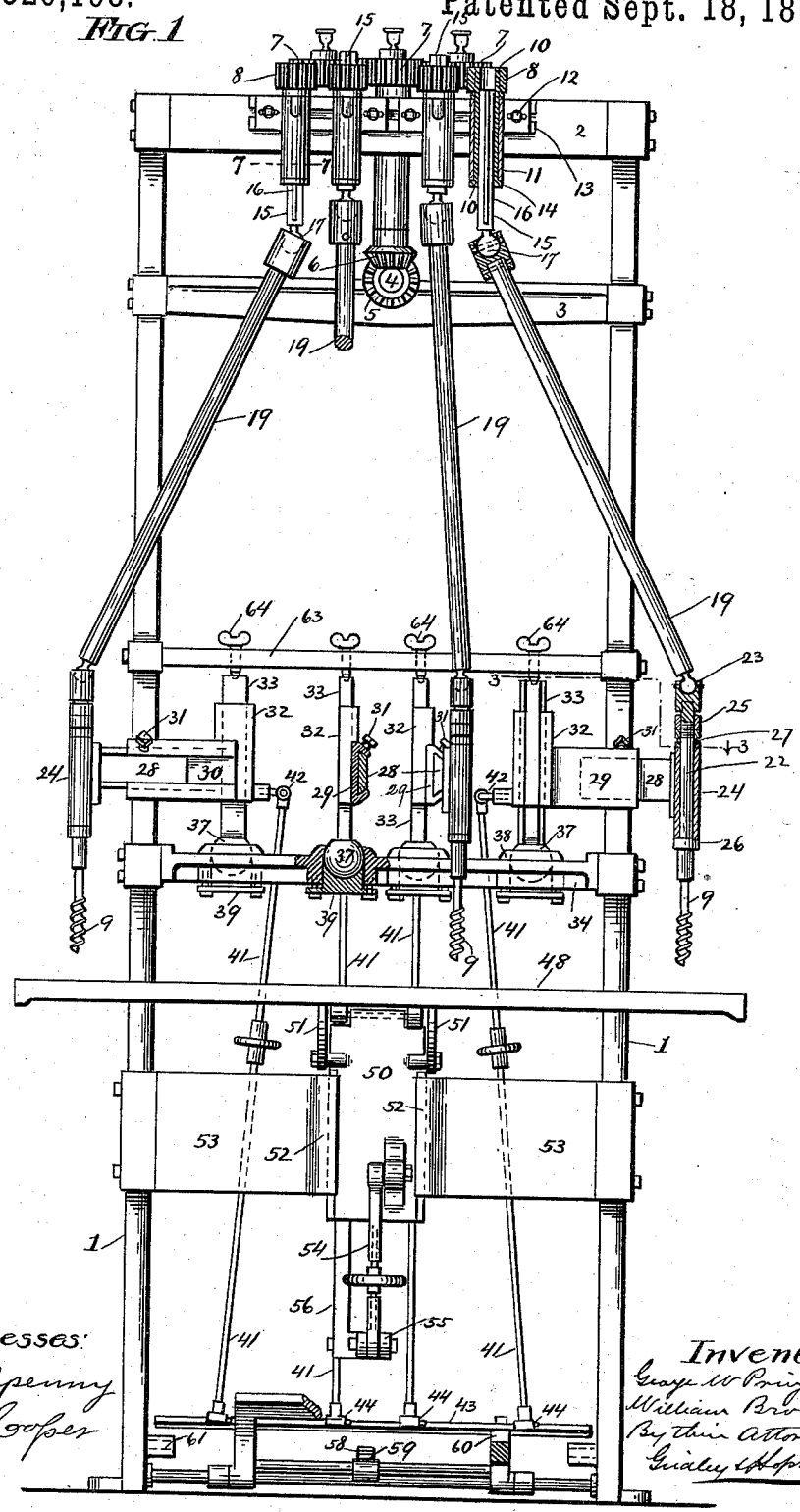

UNITED STATES PATENT OFFICE.

GEORGE W. PRINGLE AND WILLIAM BRODIE, OF CHICAGO, ILLINOIS.

BORING-MACHINE.

SPECIFICATION forming part of Letters Patent No. 526,198, dated September 18, 1894.

Application filed February 15, 1894. Serial No. 500,320. (No model.)

*To all whom it may concern:*

Be it known that we, GEORGE W. PRINGLE and WILLIAM BRODIE, citizens of the United States, residing at Chicago, in the county of Cook and State of Illinois, have invented certain new and useful Improvements in Boring-Machines, of which the following is a specification, reference being had to the accompanying drawings, which are made a part hereof, and in which—

Figure 1 is a front elevation of a boring machine embodying the invention. Fig. 2 is a vertical section thereof with the upper portion of the machine broken away. Fig. 3 is a horizontal section of a portion of the machine on the line 3—3, Fig. 1. Fig. 4 is a sectional elevation showing in detail a universal joint. Fig. 5 is a perspective view of a fragment of the machine. Fig. 6 is a section of a swivel joint. Fig. 7 is a section on the line 7—7 of Fig. 1. Fig. 8 is a sectional elevation of a portion of the machine under a slight modification.

The object of the invention is to improve the construction of boring machines, and the invention consists in the features of novelty that are particularly pointed out in the claims hereinafter.

In the drawings 1 represents the frame of the machine having at top a cross-tree 2, and beneath this latter a second cross-tree 3, to which is journaled the main driving shaft 4 carrying a beveled gear 5 meshing with a similar gear 6 secured to the lower end of a shaft that is supported by the cross-tree 2 and carries at its upper end one of a train of gears 7. The number of gears used in this train will, of course, depend upon the capacity of the machine, three being shown in the drawings. Meshing with the gears 7 are gears 8, which are connected with boring tools 9 by means of universal shafts. The accessories of each one of these boring tools are the same as the accessories of every other one, so that a description of one is equally applicable to the others, and hence, for the sake of simplicity and clearness, this description will be confined to one of them, similar parts in all being indicated by similar reference numbers.

The gear wheel 8 is rigidly attached to a grooved sleeve 10 fitting within a tubular journal-box 11, which is adjustably secured to the cross-tree 2 by means of bolts 12 passing through slotted flanges 13 with which the box is formed. The lower end of the sleeve 10 is provided with a flange 14, which engages the end of the journal-box and prevents the upward movement of the sleeve, its downward movement being prevented by the contact of the gear 8 with the box. Fitting within the sleeve 14 is a section 15 of the universal joint, provided with a spline or feather 16, which occupies the groove of the sleeve 10, the proportions of the parts being such that the shaft-section 15 is free to move endwise, but incapable of revolving relatively to the sleeve. At the extremity of the shaft-section 15 is a ball 17 provided with an opening 18 which extends through it from side to side.

19 is a second shaft-section carrying at its extremity a socket 20 in which the ball 17 fits, and 21 is a cylindrical pin passing through perforations in the socket and through the opening 18 of the ball. At the center of the ball the opening 18 is a trifle larger than the cross-section of the pin, and from the center the opening flares outward in both directions, and in the direction of the axis of the shaft-section 15, so that at each of its outer ends it presents the appearance of a slot elongated in the direction of the axis of the shaft-section 15. Throughout its length it is of a width a trifle greater than the diameter of the pin, so as to allow a free movement of the pin within it. A third shaft-section is shown at 22, connected with the other extremity of the shaft-section 19 by a joint 23, similar to the one already described. This shaft-section 22 fits within a bearing sleeve 24, and constitutes the spindle of the boring tool 9. The endwise movement of the spindle is prevented by collars 25 and 26 secured to and bearing either mediately or immediately against the extremities of the sleeve 24, the collar 26 being shown as bearing immediately and the collar 25 as bearing mediately, through anti-friction balls 27. The sleeve 24 is carried at the outer extremity of an extensible arm consisting of two parts 28 and 29, the former of which consists of a plate of dovetail shape in cross-section, and the latter of which consists of a plate having an under-cut or dovetail groove 30 in which the plate 28 fits and is adapted to slide endwise, bolts 31 being tapped through one and adapted to engage the other for holding them in any position to which they may be adjusted. This extensible arm is carried by a slide 32 arranged upon a guide or post 33, which is supported either mediately or immediately by a cross-tree 34 of the frame. As shown in Figs. 1, 2, and 3, the guide consists of a plate of dovetail shape in cross-section, and the slide 32 consists of a plate having an under-cut or dovetail groove in which the guide fits, but as shown in Fig. 8, the guide consists of a hollow cylinder 333, and the slide consists of a split sleeve 322, fitting upon it and provided upon opposite sides of its split with flanges 35, bolts 36 being passed through one of said flanges loosely and tapped into the other for the purpose of clamping the sleeve upon the post and thereby holding it to its adjustment. In Fig. 8 the base of the post is rigidly attached to the cross-tree 34 so that their relative positions cannot be changed, but in Figs. 1, 2, and 3 it is shown as being attached to the cross-tree by means of a universal joint, which enables the placing of it either in a vertical position, as shown in Figs. 1 and 3, or in an inclined position, as shown in Fig. 2. So far as we are aware, we are the first to provide a boring machine in which each one of a plurality of spindles is carried by a part that is capable of a universal adjustment, in order that the boring tools may be placed at any different angles with relation to each other, and we therefore desire to have it understood that in its broadest aspect our invention is not limited to the particular means shown in the drawings for attaining this adjustment. We prefer, however, to use the means shown in the drawings; namely, the ball and socket joint, as it is simple and effective. Concerning the details in the construction of this joint, we prefer to attach the ball 37 to the lower end of the guide and to form the socket 38 with the cross-tree 34, a follower 39 being secured to the under side of the cross-tree by means of bolts, and provided with a portion which enters the socket and engages the ball, so that by tightening the bolts sufficient friction may be applied to the ball to hold the guide at any angle to which it may be adjusted.

In order to move the spindle-carrying part for the purpose of advancing or retracting the bit, it is connected with the treadle 40 by means of suitable mechanism which will transmit both the up and down movements of the treadle, regardless of the direction in which the bit moves. For this purpose we have shown a treadle-rod 41, the upper end of which is connected with the slide 32, or an extension thereof, by means of a swivel joint 42 and the lower end of which is connected with the treadle 40—or a cross-bar 43 carried thereby—by means of a swivel joint 44. This swivel joint is constructed of a part having a cylindrical stem 45, which occupies and is adapted to turn in a socket of corresponding shape formed for it in an adjacent part, and a part 46 upon which fits an eye 47 carried by the rod 41, the parts 45 and 46 being located in the same plane, but with their axes perpendicular to each other.

The work-supporting table is shown at 48, pivoted at 49 to a slide 50, and provided with an arm 51 having a slot concentric with the pivot 49 through which passes a bolt that is tapped into the slide in order to enable the placing of the table in either a horizontal or inclined position. The slide 50 works within the guides 52 of a cross-tree 53, and is connected, by means of an adjustable link 54, with one end of a lever 55, which is fulcrumed to an arm 56 extending downward from the cross-tree 53, and the other end of which lever is provided with a pin 57 adapted to be engaged by a hook 58 carried by a link 59 pivotally connected to the treadle 40. From each of the two arms of the treadle rises a short standard 60, and into the tops of these standards are tapped bolts which pass through slots formed through the bar 43, so that said bar is held in place upon the standards by friction. When, however, the bolts are loosened, the slots permit the bar to be slipped off of the standards and to be slipped onto the shoulders 61 and beneath lugs 62, as shown in Fig. 5. When this is done, the connection between the treadle and the slide 32 is broken, and the shoulders 61 and lugs 62, operating through the bar 43, rods 41, and the swiveled joints, will hold the slides 32 against movement either upward or downward.

We have shown in the drawings treadle mechanism for moving the work table toward and from the boring tools, and also mechanism for moving the boring tools toward and from the work table, but it will be understood that both of these two sets of mechanism are not to be used at one and the same time. As shown in the drawings, the mechanism for moving the bits is shown in operative position, so that the operation of the treadle does not change the position of the table, which is shown in its lowermost position. When, however, the connection between the treadle and boring tools is broken, in the manner above described, the hook 58 may be brought into engagement with the pin 57 and thus establish a connection between the treadle and work table, so that the operation of the treadle will tend to move the table toward and from the bits instead of, as in the former instance, moving the bits toward and from the table. It will be understood, of course, that the occasion for moving the bits toward and from the table, instead of moving the table toward and from the bits, arises when two or more bits are used and their axes are not parallel. In this case it is necessary to have separate connections between the bits and the treadle and said connections should have joints which swivel, as do the joints 42 and 44.

In Figs. 1 and 2 is shown a cross-tree 63, through which thumb-screws 64 are tapped, said screws being so located that when all of the guides 33 are vertical, said screws may be turned down so as to bring their points into depressions or sockets formed in the tops of the guides for holding them against displacement.

In the drawings we have shown a machine having four bits, but of course this is to be understood as being merely illustrative, as a machine having any greater or less number of bits is within the scope of our invention.

When constructed as shown in Fig. 8, the spindle-carrying parts do not move upon their guides during the operation of the machine. They are, however, capable of a limited vertical adjustment upon their guides for the purpose of accommodating stock of different widths, and at the same time enabling the bits to be brought into contact with the stock by a minimum movement of the work table. To this end the guide consists of a hollow post having at top an internal annular flange, and having in its side longitudinal slots. 70 is a set screw having an enlarged head 71 which rests upon the top of the guide, and 72 is a nut located within the guide, fitting upon the screw and having arms which extend outward through the longitudinal slots of the guide and engage the under side of the sleeve 322, so that by turning the screw one way or the other, as may be necessary, the sleeve may be moved up or down.

What we claim as new, and desire to secure by Letters Patent, is—

1. In a boring machine, the combination with a work support, of a plurality of endwise movable spindles, said spindles being universally adjustable independently of each other so that each may be placed at the desired angle with relation to another and to the work support, means for locking the spindles against lateral movement after they are adjusted, and means for moving the spindles endwise toward and from the work, substantially as set forth.

2. In a boring machine, the combination with a work support, of a plurality of endwise movable spindles, said spindles being universally adjustable independently of each other so that each may be placed at the desired angle with relation to another and to the work support, means for locking the spindles against lateral movement after they are adjusted, a treadle, and connections between the treadle and spindles, substantially as set forth.

3. In a boring machine, the combination with a work support and a plurality of endwise movable boring spindles adjustable to different angles with relation to each other, of a treadle, and connections between said spindles and treadle, having swivel joints, substantially as set forth.

4. In a boring machine, the combination with a spindle, a guide, and a part carrying the spindle and mounted to slide upon said guide, of a second spindle, a second guide, a second part carrying the second spindle and mounted to slide upon the second guide, and means for moving the spindle-carrying parts upon their guides, said guides being adjustable to different angles with relation to each other, substantially as set forth.

5. In a boring machine, the combination with a spindle, a guide and a part carrying the spindle and mounted to slide upon said guide, of a second spindle, a second guide, a second part carrying the second spindle and mounted to slide upon the second guide, and means for moving the spindle-carrying parts upon their guides, said guides being independently adjustable about axes parallel with the spindles, substantially as set forth.

6. In a boring machine, the combination with a spindle, a guide, and a part carrying the spindle and mounted to slide upon the guide, of a second spindle, a second guide, a second part carrying the second spindle and mounted to slide upon the second guide, and means for moving the spindle-carrying parts upon their guides, said guides being adjustable to different angles with relation to each other, and also independently adjustable about axes parallel with the spindles, substantially as set forth.

7. In a boring machine, the combination with a work support, a spindle and a part carrying it, of a guide upon which said part is mounted to slide, said guide being adjustable to different angles with relation to the work support, means for securing said part in place when adjusted, and means for moving the spindle-carrying part upon the guide, substantially as set forth.

8. In a boring machine, the combination with a work support, a spindle and a part carrying it, of a guide upon which the spindle-carrying part is mounted to slide, said guide being adjustable about its own axis, means for securing the guide in any position to which it may be adjusted, and means for moving the spindle-carrying part upon the guide, substantially as set forth.

9. In a boring machine, the combination with the work support and a spindle, of a part carrying the spindle, a guide upon which the spindle-carrying part is mounted to slide, a ball and socket joint, one member of which carries a guide whereby it is made universally adjustable, and means for holding the guide in any position to which it may be adjusted, substantially as set forth.

10. In a boring machine, the combination with a work support and a spindle, of a part carrying the spindle, a guide upon which the spindle-carrying part is mounted to slide, said guide having a universal joint at one end, and a set screw for engaging its other end, substantially as set forth.

11. In a boring machine, the combination with a work support and a spindle, of a part carrying the spindle and adjustable about an axis parallel with the spindle, and means for securing said part in any position to which it may be adjusted, said part having an extensible arm extending outward from it and carrying the spindle, substantially as set forth.

12. In a boring machine, the combination with a work support and a spindle, of a part adjustable about an axis parallel with the spindle, and means for securing said part in any position to which it may be adjusted, said part having an arm extending outward from it and consisting of a plate having a socket, a second plate fitting and adapted to slide endwise in said socket, and means for securing said plates together, the spindle being carried by the outer plate, substantially as set forth.

13. In a boring machine, the combination with a work table and a spindle, of a guide consisting of the non-circular post 33, and a part carrying the spindle consisting of the plate 32 fitting and adapted to slide upon the post, and the plates 28 and 29, one having a socket in which the other fits and is adapted to slide endwise, substantially as set forth.

14. In a boring machine, the combination with a work support and a plurality of spindles, of a plurality of parts adjustable about the axes parallel with the axes of the spindles, and means for securing said parts in positions to which they may be adjusted, said parts having extensible arms by which the spindles are carried, and means for securing the parts of the arms together, substantially as set forth.

15. In a boring machine, the combination with a movable work support and a spindle, of a guide parallel with the axis of the spindle, a part carrying the spindle and mounted to slide upon said guide, and means for moving the work support toward and from the spindle, substantially as set forth.

16. In a boring machine, the combination with a work support and a plurality of spindles, of parts supporting said spindles and so adjustable that the spindles may be placed at different angles with relation to each other, a treadle, and independent connections between said treadle and each of the spindle-carrying parts, substantially as set forth.

17. In a boring machine, the combination with a work support and a plurality of spindles, of parts carrying said spindles and so adjustable that the spindles may be placed at different angles with relation to each other, a treadle, and separate connections between said treadle and each of the spindle-carrying parts, said connections having swivel joints, substantially as set forth.

18. In a boring machine, the combination with a work support and a plurality of spindles, of parts carrying said spindles and so adjustable that the spindles may be placed at different angles with relation to each other, said parts being independently adjustable about axes parallel with the axes of the spindles, a treadle, and separate connections between said treadle and each of the spindle-carrying parts, said connections having swivel joints, substantially as set forth.

19. In a boring machine, the combination of a movable work support, a plurality of spindles, parts carrying said spindles and movable in directions parallel with the axes of said spindles, said parts being so adjustable that the spindles may be placed at different angles with relation to each other, a treadle, detachable connections between said treadle and the spindle-carrying parts, and detachable connections between said treadle and the work support whereby either the spindle-carrying parts or work support may be connected with and operated by the treadle, substantially as set forth.

20. In a boring machine, the combination of a plurality of spindles, parts by which said spindles are carried, guides upon which said parts are mounted and adapted to slide, rods 41 connected to the spindle-carrying parts, the bar 43 to which said rods are connected, means for securing said bar to the frame, a movable work support, a treadle, and connections between the treadle and work support, substantially as set forth.

21. In a boring machine, the combination with a spindle, of a part carrying the spindle, a guide upon which the spindle-carrying part is mounted and adapted to slide, said guide being universally adjustable, a treadle, and connections between the treadle and spindle-carrying part, said connections including a part having a cylindrical stem 45 occupying a socket formed in an adjacent part, and a cylindrical portion 46 occupying a socket formed in an adjacent part, the parts 45 and 46 being located with their axes perpendicular to each other, substantially as set forth.

GEORGE W. PRINGLE.
WILLIAM BRODIE.

Witnesses:
L. M. HOPKINS,
J. HALPENNY.